Oct. 30, 1956  V. E. W. ANDERSON  2,768,608
INSECTICIDE APPLICATOR FOR LIVESTOCK
Filed June 1, 1955  2 Sheets-Sheet 1

INVENTOR
VIRGIL E. W. ANDERSON
BY
McMorrow, Berman & Davidson
ATTORNEYS

Oct. 30, 1956  V. E. W. ANDERSON  2,768,608
INSECTICIDE APPLICATOR FOR LIVESTOCK
Filed June 1, 1955  2 Sheets—Sheet 2

INVENTOR
VIRGIL E. W. ANDERSON
BY
McMorrow, Berman & Davidson
ATTORNEYS

United States Patent Office 2,768,608
Patented Oct. 30, 1956

2,768,608

INSECTICIDE APPLICATOR FOR LIVESTOCK

Virgil E. W. Anderson, Windom, Kans.

Application June 1, 1955, Serial No. 512,496

2 Claims. (Cl. 119—157)

This invention relates to devices for applying insecticide to cattle and other live stock. More particularly, the invention has reference to a combined insecticide applicator and "cattle scratcher," so designed as to cause the insecticide to be applied to the backs of the cattle responsive to rubbing of the cattle against the device, with the rubbing action being adapted for causing operation of a pump means used to continuously circulate insecticide through the structure.

It is desirable that means be provided for, at periodic intervals, applying insecticide to cattle, and the manual application of the insecticide to the cattle, particularly where there is a relatively large herd, is a time-consuming and laborious operation.

The cattle like to rub their backs and stomachs upon adjacent surfaces, and accordingly, it is proposed to provide an insecticide applicator which will be so designed as to include wick means against which the cattle will rub, said wick means being saturated with a liquid insecticide so as to cause the insecticide to be forced out of the wick means onto the hide of the animal.

It is further proposed to mount the wick means on a pivoted frame having an insecticide circulation system incorporated in, so that insecticide may be circulated through the frame to keep the wicks saturated.

Still another object is to so design the frame as to cause the same to operate a pump for circulating the liquid insecticide therethrough, with the movement of the frame that causes operation of the pump being caused by pressure exerted against the frame by the animal. Thus, the animal, by rubbing its hide against the frame, causes insecticide to be distributed over its hide, and at the same time causes additional insecticide to be circulated through the frame.

Yet another object is to provide a structure as described which will be so designed as to cause the movement of the frame to be effected by the animal, whether the animal is straddling the frame, or is exerting upward pressure thereagainst.

Still another object of importance is to form the structure in such a manner as to permit its manufacture at relatively low cost, while still assuring that the device will withstand rugged use and exposure to the elements.

Other objects will appear from the following description, the claims appended thereto, and from the annexed drawings in which like reference characters designate like parts throughout the several views and wherein:

Figure 4:
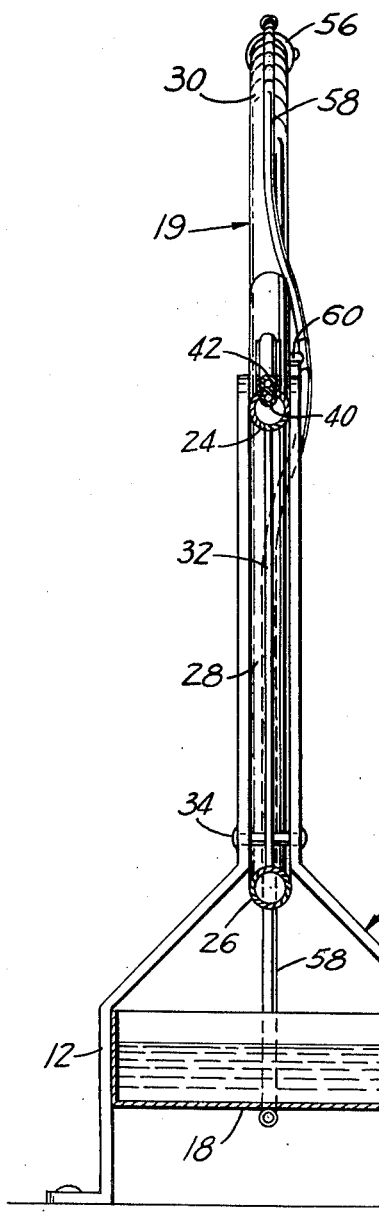
Figure 4 is an enlarged transverse sectional view on line 4—4 of Figure 1.

The reference numeral 9 generally designates a support, including at its front end a pair of laterally spaced front standards 10, 12 which, as shown in Figure 4, are spaced a substantial distance apart at their lower ends, and have upwardly convergent intermediate portions, the straight, elongated upper end portions of the standards being closely spaced apart and being extended vertically.

Figure 3:
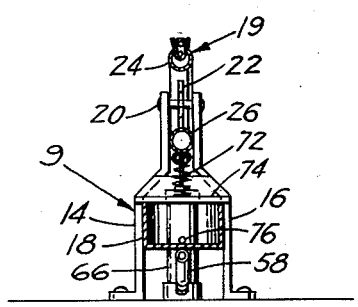
Figure 3 is a transverse sectional view on line 3—3 of Figure 1.
Figure 5:
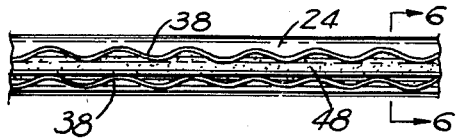
Figure 5 is a fragmentary plan view of one of the pipe members of the frame, on an enlarged scale, as seen from the line 5—5 of Figure 1.

The support also includes rear standards 14, 16, lower in height than the front standards, and as shown in Figure 3 formed with widely spaced lower ends merging into convergent portions that in turn merge into closely spaced upper ends.

Between the widely spaced lower ends of the front and rear standards there is mounted, in a position elevated above the ground, an open-topped reservoir 18 for a liquid insecticide.

Figure 1:
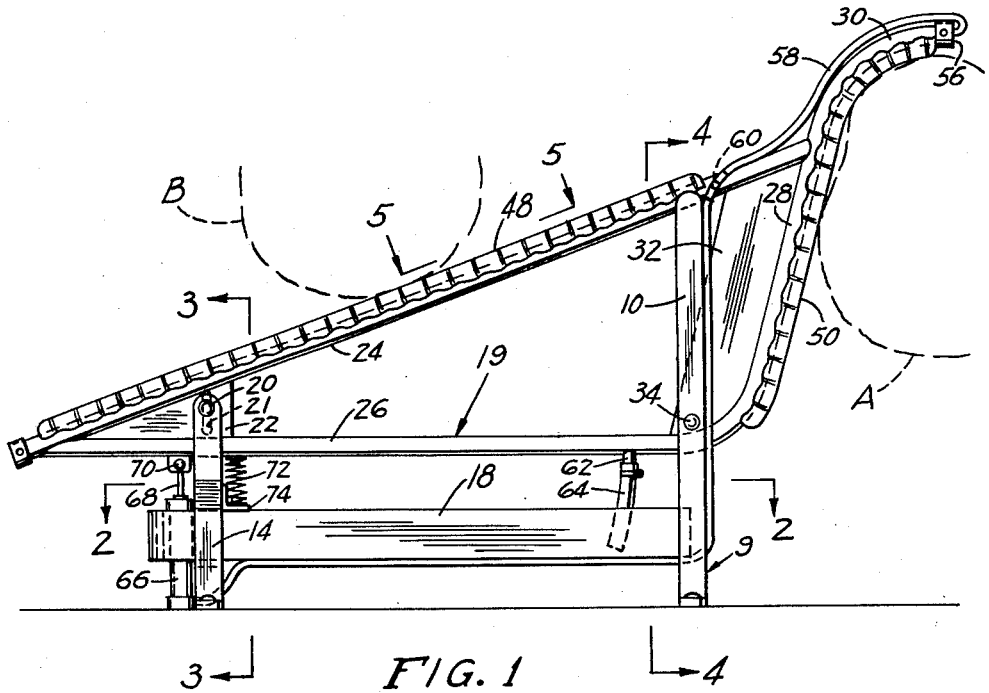
Figure 1 is a side elevational view of an applicator formed according to the present invention.
Figure 2:
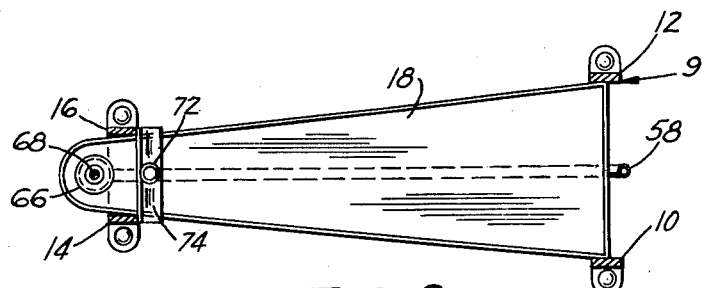
Figure 2 is a plan sectional view on line 2—2 of Figure 1.

A pivoted frame generally designated 19 is carried by the support, and as shown in Figure 1 is of approximately triangular formation, being disposed in a vertical plane and pivoting about a horizontal axis. Adjacent its rear, smaller end, the frame is guided, in its up and down swinging movement, by and between the rear posts 14, 16. A pin 20 extends between the upper extremities of the rear posts or standards, through an arcuate slot 21 formed in a reinforcing gusset 22 of the frame. Welded to the upper edge of the gusset is the rear end portion of an elongated pipe member 24 inclined from the horizontal, while welded to the lower edge of the gusset is a normally horizontal pipe member 26 merging at its front end into a pipe member 28 inclined slightly from the vertical, which in turn at its front end merges into a forwardly curving extension 30. A gusset 32 is welded to the members 24, 28, 26 to reinforce the same. At their rear ends, the pipe members 24, 26 are connected in communication, and at its front end, pipe member 24 is connected to the upper end portion of pipe member 28.

A pivot pin 34 extends between the front standards 10, 12, passing through an opening formed in the gusset 32 to provide a pivotal mounting of the frame 19 upon the support. The up and down pivotal movement of the frame is limited by the length of the slot 21.

Figure 6:
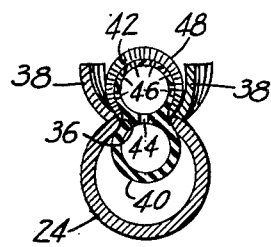
Figure 6 is a transverse sectional view through the pipe member, the scale being enlarged still further, on line 6—6 of Figure 5.

As shown in Figure 6, pipe member 24 has a longitudinal slot 36 formed therein, said slot terminating adjacent the opposite ends of the member 24, and welded to the member 24 at opposite sides of said slot are undulant or corrugated metal strips 38, providing protective side walls for a wick means shown in Figure 6. The strips are waved to strengthen the same, and also to provide wavy surfaces against which the cattle may rub.

As shown in Figure 6, within pipe member 24 there is provided a rubber liquid circulation tube 40, including an outer portion 42 separated from the inner portion of the tube through the medium of a longitudinal partition, so that the tube has side-by-side channels connected in communication with one another by a longitudinal series of apertures 44 formed in the partition. In the outer portion 42 of the tube there are provided apertures 46, through which liquid insecticide may pass to saturate a wick member 48 covering the outer portion 42. Wick member 48 projects to a slight extent beyond the outer longitudinal edges of the protective strips 38, and thus, when the cattle rub against the wick means, their skin contacts the absorbent, compressible wick member 48, forcing insecticide out of the wick member onto the skin of the animal, the animal also rubbing against the strips 38 to distribute said insecticide.

The pipe member 28 and extension 30 are formed similarly to the member 24, having the corrugated strips and wick member 50, so that a cow A rubbing its back against the underside of the extension 30 and against the member 28 will cause the insecticide to be forced onto its skin. Similarly, a cow B may straddle the device, with its underside in engagement with the wick member 48, thus to provide for maximum distribution of the insecticide.

Figure 7:
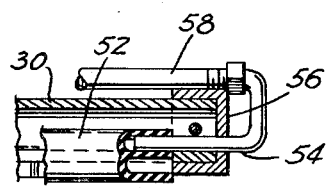
Figure 7 is an enlarged, fragmentary sectional view of the end of one of the pipe members showing its connection to a wick supply tube.

Referring to Figure 7, the circulating tube within the extension 30 has been designated at 52, and liquid is forced into the same by means of an L-shaped connecting tube element 54 mounted in a removable cap 56 that is applied to the end of the extension 30. At its inlet end, element 54 is connected in communication with a liquid supply tube 58 which, as shown in Figure 1, extends exteriorly of the several pipe members. Liquid flowing through the tube 58 will pass into the tube 52 of extension 30, and will also pass into the tube 40 of pipe member 24, due to the provision (see Figures 1 and 4) of a branch tube element 60 connected between the tube 58 and the tube 40.

Thus, the liquid is forced into the upper ends of the members 24, 30 and tends to flow downwardly within said members to saturate the wicks. Excess liquid, flowing within the tubes of said members, is drained off through a drain fitting 62 depending from the member 26. The excess liquid flowing downwardly within the pipe member 24 flows into the pipe member 26 through the medium of the communicating rear ends of members 24, 26, and the liquid draining downwardly through members 30, 28 also passes into member 26, at the other end of said member 26. A short drain hose 64 is connected to the fitting 62, and returns the liquid insecticide to the tank or reservoir 18.

A vertically disposed reciprocating pump 66 has a pump rod or piston 68 provided with a loose pivotal connection 70 to the member 26 adjacent the rear end of the frame. A spring 72 is supported upon a cross bar 74 mounted upon the reservoir transversely thereof, and at its upper end abuts against the underside of member 26, so as to normally tend to swing the frame 19 in a clockwise direction about its pivotal axis 34.

The pump as shown in Figure 3 has a check valved inlet 76 whereby insecticide may be sucked into the pump cylinder while being prevented from flowing back into the reservoir. At its output side, the pump is connected to the lower, inlet end of the supply tube 58. The piston of the pump moves upwardly under the force of the spring 72, when the spring expands, and moves downwardly by pressure exerted on the frame by the cow. Thus cow A exerts an upward pressure on the frame to the right of the pivot axis 34, tending to swing the rear end of the frame downwardly to force the pump rod 68 in a downward direction with the pump rod being returned by the spring. Similarly, the cow B will also exert downward pressure, at the left of the pivot axis, upon the rear end of the frame, to cause a similar operation of the pump.

In use, when the pump rod is forced downwardly by the pivotal movement of the frame in a counterclockwise direction about pivot axis 34, which movement is caused by the cows rubbing against the frame, liquid within the pump cylinder will be forced into the tube 58. The connection of the tube 58 to the pump cylinder is check valved, so as to permit only flow of the liquid into the tube 58, while preventing return flow through tube 58 into the pump cylinder.

Eventually, the liquid forced upwardly within the tube 58 will move through the pipe members, to saturate the several wick members. Any excess liquid will return to the reservoir in the manner previously described for recirculation through the pivoted frame.

Figure 8:
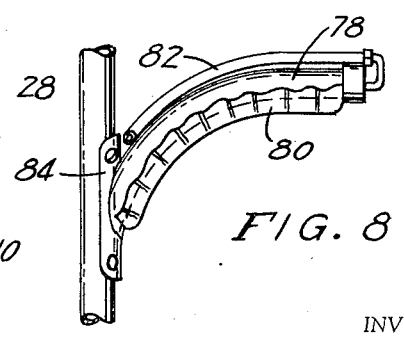
Figure 8 is an enlarged, fragmentary side elevational view showing an attachment which can be placed on the device for smaller cattle.

In Figure 8 there is shown an attachment that can be secured to the pipe member 28, below extension 30, for smaller cattle or calves. This includes a forwardly projecting, curved pipe branch 78, having wick means 80 similar to those previously described. A supply tube 82 extends to the circulating tube of the pipe member 78, and would be connected in communication with the main supply tube 58. A mounting plate 84 is secured fixedly to the inner end of pipe member 78, and is bolted to the pipe member 28.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. An insecticide applicator for live stock comprising a support; a reservoir for a liquid carried by said support; a frame pivoted on the support and adapted to be moved in at least one direction by pressure exerted thereon by an animal rubbing thereagainst, said frame being of tubular formation for circulation of a liquid insecticide therethrough and including a plurality of connected pipe members having longitudinal slots formed therein, liquid circulating tubes in the slots extending longitudinally of the pipes, and elongated wick members on said tubes providing surfaces against which the animal may rub, the tubes having outlet ports through which the insecticide may pass into said wick members, said frame having an inlet and an outlet for directing liquid into and permitting drainage of the liquid out of the tubes; pump means arranged to circulate the insecticide through the tubes and connected to the frame for operation responsive to pivotal movement to the frame by said animal; and a connection between the output side of the pump means and the frame inlet for forcing insecticide into the tubes by operation of the pump means, the reservoir being in communication with the input side of the pump means, said frame being adapted for passage of excess liquid circulating therein, out of the outlet of the frame into said reservoir.

2. An insecticide applicator for live stock comprising a support; a reservoir for a liquid carried by said support; a frame pivoted on the support and adapted to be moved in at least one direction by pressure exerted thereon by an animal rubbing thereagainst, said frame being of tubular formation for circulation of a liquid insecticide therethrough and including a plurality of connected pipe members having longitudinal slots formed therein, undulant strips secured to the pipe members at opposite sides of said slots to receive the pressure exerted by the animal, liquid circulating tubes engaged in the slots between the strips for protection by the strips and extending longitudinally of the pipe members, and elongated wick members on said tubes projecting beyond said strips to provide surfaces in addition to the strips against which the animal may rub, the tubes having outlet ports through which the insecticide may pass into said wick members, said frame having an inlet and an outlet for the circulation of liquid through the tubes; pump means arranged to circulate the insecticide through the tubes and connected to the frame for operation responsive to pivotal movement to the frame by said animal; and a connection between the output side of the pump means and the frame inlet for forcing insecticide into the tubes by operation of the pump means, the reservoir being in communication with the input side of the pump means, said frame being adapted for passage of excess liquid circulating therein, out of the outlet of the frame into said reservoir.

References Cited in the file of this patent
UNITED STATES PATENTS

| | | |
|---|---|---|
| 1,256,828 | Perry | Feb. 19, 1918 |
| 1,300,297 | Randall | Apr. 15, 1919 |
| 2,706,465 | Caldwell | Apr. 19, 1955 |